United States Patent
Shimizu

(10) Patent No.: US 12,535,476 B2
(45) Date of Patent: Jan. 27, 2026

(54) RESIN MOLDED COMPONENT, IMAGE FORMING APPARATUS, AND DETERMINATION METHOD

(71) Applicant: Keiichi Shimizu, Kanagawa (JP)

(72) Inventor: Keiichi Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

(21) Appl. No.: 18/757,610

(22) Filed: Jun. 28, 2024

(65) Prior Publication Data

US 2025/0020628 A1 Jan. 16, 2025

(30) Foreign Application Priority Data

Jul. 11, 2023 (JP) .................. 2023-113959

(51) Int. Cl.
| | |
|---|---|
| *G01N 17/00* | (2006.01) |
| *G01N 33/44* | (2006.01) |
| *G03G 21/00* | (2006.01) |
| *G03G 21/16* | (2006.01) |

(52) U.S. Cl.
CPC ....... *G01N 33/442* (2013.01); *G03G 21/1633* (2013.01); *G03G 2221/1663* (2013.01)

(58) Field of Classification Search
CPC .......... G03G 21/1633; G03G 21/1875; G03G 2221/1663; G01N 17/043; G01N 33/442; Y02W 30/62
See application file for complete search history.

(56) References Cited

U.S. PATENT DOCUMENTS

| | | | |
|---|---|---|---|
| 2001/0036666 A1 | 11/2001 | Sahashi | |
| 2014/0086629 A1* | 3/2014 | Fujiwara | G03G 21/1839 399/111 |
| 2015/0329305 A1 | 11/2015 | Shimizu et al. | |
| 2016/0097231 A1 | 4/2016 | Shimizu | |
| 2017/0060075 A1 | 3/2017 | Shimizu et al. | |
| 2019/0100045 A1 | 4/2019 | Shimizu | |
| 2025/0003862 A1* | 1/2025 | Toyooka | G01N 17/043 |

FOREIGN PATENT DOCUMENTS

| | | |
|---|---|---|
| JP | 2001-330554 A | 11/2001 |
| JP | 2010-148809 A | 7/2010 |
| JP | 2010-281606 A | 12/2010 |

* cited by examiner

*Primary Examiner* — Sophia S Chen
(74) *Attorney, Agent, or Firm* — XSENSUS LLP

(57) ABSTRACT

A resin molded component includes a discoloration checker made of a first material discolored at a first speed; and a resin molded portion including the discoloration checker, the resin molded portion made of a second material discolored at a second speed faster than the first speed at which the first material of the discoloration checker discolors.

20 Claims, 2 Drawing Sheets

RESIN MOLDED COMPONENT, IMAGE FORMING APPARATUS, AND DETERMINATION METHOD

CROSS-REFERENCE TO RELATED APPLICATIONS

This patent application is based on and claims priority pursuant to 35 U.S.C. § 119(a) to Japanese Patent Application No. 2023-113959, filed on Jul. 11, 2023, in the Japan Patent Office, the entire disclosure of which is hereby incorporated by reference herein.

BACKGROUND

Technical Field

Embodiments of the present disclosure relate to a resin molded component, an image forming apparatus, and a determination method.

Related Art

Resin molded parts used in devices such as image forming apparatuses may deteriorate due to the influence of the ultraviolet rays, heat, and water vapor during the use of the products. When a resin molded portion deteriorates, it is necessary to consider how to treat the resin molded portion. For this consideration, it is required to determine the degree of deterioration of the resin molded portion. Thus, a simple method for determining the degree of deterioration of resin molded portions has been sought.

SUMMARY

An embodiment of the present disclosure provides a resin molded component includes a discoloration checker made of a first material discolored at a first speed; and a resin molded portion including the discoloration checker, the resin molded portion made of a second material discolored at a second speed faster than the first speed at which the first material of the discoloration checker discolors.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
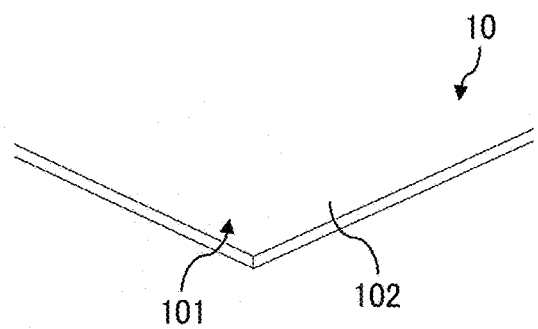
FIG. 1A is a diagram of initial-state discoloration checker and resin molded portion.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A resin molded component is disclosed that includes a deterioration status checker with lower weather resistance than the resin molded component itself, which allows the checking of the deterioration status. This deterioration status checker verifies the deterioration status of the resin molded component based on the color change of the deterioration status checker. This checker allows the deterioration status of the resin molded component to be easily and reliably determined with visual inspection.

However, the appearance quality of the deterioration status checker starts to significantly degrade at an earlier stage than other resin molded portions. Thus, installing it at a location where it is easily visible to the user is difficult. As such, it is difficult to install the deterioration status checker at a location where it can be easily checked visually based on its appearance. Thus, there is a need for technology that allows for easily determining the degree of deterioration of resin molded portions by visual inspection.

According to one aspect of the present disclosure, a resin molded component whose degree of deterioration can be easily determined by visual inspection is provided.

With reference to the drawings, a description is now given of a resin molded portion, an image forming system, and a determination method according to an embodiment of the present disclosure. Although the present disclosure is not limited to the embodiments described below, and can be modified within a range that can be conceived by a person skilled in the art, such as addition, change, or deletion of other embodiments, and any of the embodiments is included in the scope of the present invention as long as the functions and effects of the present invention are achieved.

A resin molded portion according to an embodiment of the present disclosure incudes a discoloration checker and a resin molded portion. The discoloration checker and the resin molded portion both discolor due to degradation caused by a decline in physical properties. The discoloration checker is made of material more resistant to discoloration the resin molded portion. The discoloration checker may be referred to as a deterioration checker.

The applications of resin molded portions are not particularly limited to specific uses and can include devices such as image forming apparatuses. Examples of the apparatus to which the resin molded portion of the present embodiment can be applied include home electric appliances such as air conditioners, projectors, and cameras, in addition to image forming apparatuses. The image forming apparatus of the present embodiment includes a resin molded portion according to an embodiment of the present disclosure. An embodiment of the present disclosure provides a method for determining whether a resin molded portion of a resin molded product is reusable or recyclable.

The discoloration checker and the resin molded portion experience a decline in physical properties due to external factors such as ultraviolet rays, heat, and water vapor, as well as time-dependent deterioration. The discoloration checker and the resin molded portion differ in weather resistance. Using this difference, the decline in the physical properties is visualized as the discoloration of the resin. This allows the degree of deterioration of the resin molded portion to be determined through visual inspection. For example, color difference $\Delta E1$ between the discoloration checker and the color sample is visually obtained, and color difference $\Delta E2$ between the resin molded portion and the color sample is visually obtained. By comparing the color differences $\Delta E1$ and $\Delta E2$, the degree of deterioration of the resin molded portion can be visually quantified.

The discoloration checker is made of a material that is more resistant to discoloration than the resin molded portion. Examples of the material that is more resistant to discoloration include a material that has better weather resistance than the resin molded portion.

Whether the material of the discoloration checker is more resistant to discoloration than the resin molded portion can be determined by using well-known weather resistance test. The discoloration checker and the resin molded portion are subjected to the weather resistance test under the same conditions. Then, the results are compared to determine whether the material of the discoloration checker is more resistant to discoloration than the resin molded portion. The weather resistance test includes a test for measuring durability against ultraviolet light, heat, or water vapor.

The discoloration checker is included in the resin molded component, either integral with or separate from the resin molded portion. The discoloration checker integral with the resin molded portion refers to one that is combined with the resin molded portion by, for example, molding, welding, or bonding at the time of shipment. The discoloration checker separate from the resin molded portion refers to one that is combined with the resin molded portion by using a tool such as a fastener. One or more discoloration checkers are included in the resin molded component.

The discoloration checker is preferably made of a material that is more resistant to discoloration from ultraviolet light, heat, or water vapor than the resin molded portion. In this case, the discoloration checker is less likely to discolor due to deterioration than the resin molded portion, and thus the accuracy of determining the degree of deterioration of the resin molded portion can be enhanced.

Although it depends on the usage situation of the resin molded portion, it is assumed that the resin molded portion is influenced by ultraviolet rays even when used indoors, as ultraviolet rays are irradiated by sunlight. When the resin molded component is used in the image forming apparatus, heat can come from a source such as a fixing unit or a heater. Examples of water vapor include moisture in the air in the use environment, and water vapor generated from a fixing unit when the resin molded portion is used in an image forming apparatus.

The following method can be used to measure and determine whether the material of the discoloration checker is less likely to discolor or more resistant to discoloration from ultraviolet light, heat, or water vapor than the resin molded portion.

In the case of ultraviolet rays, the amount of ultraviolet rays received per unit area is made the same for the discoloration checker and the resin molded portion. Ultraviolet rays are then irradiated for a prescribed time, and the degree of discoloration of the irradiated portion is examined.

In the case of heat, the amount of heat (thermal energy) received per unit area is made the same for the discoloration checker and the resin molded portion. Heat is then applied from a heat source for a prescribed time, and the degree of discoloration of the heated portion is examined.

In the case of water vapor, the degree of discoloration is examined by detecting the discoloration that occurs when water vapor is brought into contact with the surfaces of the discoloration checker and the resin molded portion for a prescribed time. When water vapor is brought into contact with the discoloration checker and the resin molded portion, discoloration occurs due to hydrolysis. In this case, the amount of water vapor received per unit area is made the same for the discoloration checker and the resin molded portion.

In the present embodiment, the discoloration checker and the resin molded portion discolor due to deterioration caused by a decline in their physical properties. The term "physical properties" referred to herein include, for example, molecular weight and mechanical strength. As a method for examining whether discoloration occurs due to the deterioration of physical properties, a known measurement method is used according to the type of the physical properties.

Preferably, the discoloration checker is made of a material that is more resistant to discoloration than the resin molded portion. It is also preferable that both the discoloration checker and the resin molded portion discolor due to their deterioration, and that their degree of discoloration due to the deterioration should be substantially the same. This configuration allows the degree of deterioration of the resin molded portion to be easily determined by the discoloration checker. Further, the resin molded portion, which is made of a material that is less likely to discolor, allows for a longer lifetime of the resin molded product.

The relation between the discoloration checker and the resin molded portion is expressed as follows.

When $\Delta E1$ is greater than 1 ($\Delta E1>1$) after a time has elapsed since the initial stage, the following condition is satisfied: $0<\Delta E2-\Delta E1 \leq 1$, where $\Delta E1$ indicates a color difference between the discoloration checker and the color sample, and $\Delta E2$ indicates a color difference between the resin molded portion and the color sample. When the difference between $\Delta E2$ and $\Delta E1$ is less than or equal to 1 ($\Delta E2-\Delta E1 \leq 1$), the degree of discoloration is substantially the same.

The color sample is designed to have the same color as the discoloration checker at its initial state. The color sample may be placed in the vicinity of the discoloration checker without discoloring. This eliminates the need to search for the color sample when making a determination. Alternatively, the color sample may be placed in a different location from the discoloration checker without discoloring. In this case, the color sample is brought in when making the determination.

To quantify the color difference using the color sample, the following method can be used, for example. The color sample, which includes multiple colors representing different levels of color difference in stages, is placed at a position where it can be compared to the sample to be quantified. Then, the numerical value of a color closest to the sample is read. Thus, the color difference can be quantified as a numerical value. These operations can be performed visually.

The condition where $\Delta E1>1$ indicates that the discoloration checker has discolored. Further, the condition where $0<\Delta E2-\Delta E1$ indicates that the degree of discoloration of the resin molded portion is greater than the degree of discoloration of the discoloration checker. In this case, the discoloration checker is made of a material that is more resistant to discoloration than the resin molded portion. Further, the condition where $\Delta E2-\Delta E1 \leq 1$ indicates that the discoloration checker and the resin molded portion exhibit substantially the same degree of discoloration due to their respective deterioration.

The material of the discoloration checker preferably deteriorates more slowly in physical properties than material of the resin molded portion. This configuration advantageously facilitates the determination of the difference in the degree of deterioration in physical properties between the discoloration checker and the resin molded portion. As described above, the term "physical properties" referred to herein include, for example, molecular weight and mechanical strength. The rate of change at which the physical properties deteriorate can be determined by, for example, performing a known weather resistance test.

In the initial state, the discoloration checker is preferably made of a material having substantially the same color as the resin molded portion. In this case, when the color difference between the discoloration checker and the resin molded portion is visually compared, it becomes easier to immediately determine the deterioration of the resin molded portion.

To determine whether the material of the discoloration checker has substantially the same color as the resin molded portion, for example, a method of examining the color using a color sample can be used. When the difference between $\Delta E1$ and $\Delta E2$ is greater and or equal to $-1$ and less than or equal to 1 ($-1 \leq \Delta E2 - \Delta E1 \leq 1$), the discoloration checker and the resin molded portion are considered to have substantially the same color, where $\Delta E1$ indicates a color difference between the discoloration checker and the color sample, and $\Delta E2$ indicates a color difference between the resin molded portion and the color sample. The color samples are described later.

Preferably, the discoloration checker and the resin molded portion are influenced by external factors to substantially the same degree. With substantially the same degree of influence from external factors, the color difference between the discoloration checker and the color sample, as well as the color difference between the resin molded portion and the discoloration checker, can be easily compared visually. This makes it easier to determine the degree of deterioration of the resin molded portion.

Examples of the influence from external factors include ultraviolet rays, heat, and water vapor exemplified above. The following exemplifies substantially the same degree of influence from ultraviolet rays, heat, and water vapor.

Ultraviolet rays are described below.

A specific area in the resin molded component is designated as an inspection area. The inspection area can be visible from the outside when the resin molded component is used. The inspection area includes the discoloration checker and at least a part of the resin molded portion. In this case, preferably, in the configuration during the use of the resin molded product, the amount of ultraviolet rays received per unit area by the discoloration checker in the inspection area is within $\pm 10\%$ of the amount of ultraviolet rays received per unit area by the resin molded portion included in the inspection area. By satisfying this numerical range, the discoloration checker and the resin molded portion can be influenced by ultraviolet rays to substantially the same degree.

Heat is described below.

A specific area in the resin molded component is designated as an inspection area. The inspection area includes the discoloration checker and at least a part of the resin molded portion. In this case, when the resin molded component is arranged for use and held for a certain time period, the temperature of the discoloration checker in the inspection area is preferably within $\pm 10\%$ of the temperature of the resin molded portion included in the inspection area. By satisfying this numerical range, the discoloration checker and the resin molded portion can be influenced by heat to substantially the same degree.

The term "a certain time period" may be selected as appropriate. For example, the resin molded component may be held for a long time. Further, when the temperature in the inspection area is measured, the temperature is measured while an apparatus in which the resin molded component is used is operating, so as to accurately measure the temperature during the use of the resin molded component.

Water vapor are described below.

A specific area in the resin molded component is designated as an inspection area. The inspection area includes the discoloration checker and at least a part of the resin molded portion. In this case, when the measurement value obtained by the following measurement is considered as the influence from water vapor on the discoloration checker and the resin molded portion, the influence from water vapor on the discoloration checker included in the inspection area is preferably within $\pm 10\%$ of the influence from water vapor on the resin molded portion included in the inspection area in the arrangement of the resin molded component during use. By satisfying this numerical range, the discoloration checker and the resin molded portion can be influenced by water vapor to substantially the same degree.

[Measurement of Influence from Water Vapor]

In the case of water vapor, the color difference $\Delta E$ ($\Delta E1$ for the discoloration checker and $\Delta E2$ for the resin molded portion, both compared to the color sample) is obtained by detecting the discoloration that occurs when water vapor is brought into contact with the surfaces of the discoloration checker and the resin molded portion in the inspection area for a prescribed time. When the difference between the color difference $\Delta E1$ for the discoloration checker and the color difference $\Delta E2$ for the resin molded portion is within 1, it can be said that the influence from water vapor on the discoloration checker is within $\pm 10\%$ of the influence from water vapor on the resin molded portion in the inspection area. When water vapor is brought into contact with the discoloration checker and the resin molded portion, discoloration occurs due to hydrolysis.

To measure the amount of ultraviolet rays, the rate of temperature rise, and the influence of water vapor, detectors may be placed on both the discoloration checker and the resin molded portion in the inspection area.

The position where the discoloration checker is placed may be selected as appropriate. Examples of the position of the discoloration checker are described later with reference to FIGS. 1A and 1B, but some of them will be described as follows. The discoloration checker and the resin molded portion are preferably positioned to satisfy one or more of the following conditions.

The discoloration checker is preferably positioned within the resin molded component at a location where the color difference from the resin molded portion can be visually observed. The position where the color difference from the resin molded portion can be visually observed includes, for example, a position where the discoloration checker and the resin molded portion are adjacent to each other. With such an arrangement, the degree of deterioration of the resin molded portion can be easily determined by the color difference.

When the resin molded component is detachably attached inside the cover of the apparatus, the discoloration checker is preferably positioned to be visually observed either with the cover open or with the resin molded component detached after the cover is opened. With such an arrangement, the color difference for each of the discoloration checker and the resin molded portion can be easily visually observed. This enables the degree of deterioration of the resin molded portion to be determined by the color difference.

The discoloration checker is preferably positioned on a surface facing in the same direction as the resin molded portion. In other words, the amount of ultraviolet light received per unit area by the discoloration checker is preferably substantially the same as that received by the resin molded portion.

The details described above for the inspection area can be applied to the amount of ultraviolet rays discussed in this context. With the discoloration checker placed on the surface facing in the same direction as the resin molded portion, the discoloration checker receives the same amount of ultraviolet rays as that of the resin molded portion during the use of the product, enabling the degree of deterioration to be determined with higher accuracy.

The discoloration checker is preferably placed at the position to receive the same influence from the heat source as that of the resin molded portion. In other words, the discoloration checker is preferably place so that the influence of the heat source on the discoloration checker is the same as the influence of the heat source on the resin molded portion.

By arranging the discoloration checker so that its temperature rise due to the thermal energy from the heat source is the same as that of the resin molded portion, the discoloration checker receives the same amount of thermal energy from the heat source as the resin molded portion during the use of the apparatus. This enables a higher accuracy in determining the degree of deterioration.

Examples of the heat source include a fixing unit and a heater when the resin molded component is used in an image forming apparatus.

The discoloration checker is preferably placed in a position to receive the influence of water vapor to substantially the same degree as that of the resin molded portion.

By arranging the discoloration checker so that its degree of influence from water vapor is the same as that of the resin molded portion, the discoloration checker is exposed to the same amount of water vapor from the heat source as the resin molded portion during the use of the product. This enables a higher accuracy in determining the degree of deterioration.

The term "water vapor" includes, for example, water vapor that occurs from a fixing unit when the resin molded component is used in an image forming apparatus.

A determination method according to an embodiment of the present disclosure is described below.

The determination method of the present embodiment is a determination method for determining whether the resin molded portion of the resin molded component of the present embodiment can be reused or recycled.

The determination method of the present embodiment involves comparing the discoloration checker to the color sample to obtain the color difference $\Delta E1$, comparing the resin molded portion to the color sample to obtain the color difference $\Delta E2$, and determining the degree of deterioration of the resin molded portion based on the color difference $\Delta E1$ and the color difference $\Delta E2$. This method enables the determination of whether the resin molded portion of the resin molded component is reusable or recyclable. In this method, the color difference between the discoloration checker and the color sample, as well as the color difference between the resin molded portion and the color sample, can be visually obtained using the color sample. This allows for the immediate identification of the degree of deterioration of the resin molded portion and the immediate visual determination of whether the resin molded portion is reusable or recyclable.

Reusing refers to using the resin molded component again as it, without reprocessing. The term "reusable" is also referred to as "recyclable", and recycling refers to converting the resin molded portion back into resin material for reuse. The conditions for determining whether the resin molded portion is reusable or recyclable are described below.

When the discoloration is minimal in both the discoloration checker and the resin molded portion, the resin molded portion is determined to be reusable. In other words, when $\Delta E1$ is less than 1 ($\Delta E1<1$) and $\Delta E2$ is less than 1 ($\Delta E2<1$), the resin molded portion is determined to be reusable. In this case, even if the resin molded portion is influenced by external factors, it can be determined that the resin molded portion retains its reusable physical properties.

When the degree of discoloration of the discoloration checker is small and the degree of discoloration of the resin molding part is large, the resin molding part is determined to be recyclable. In other words, when $\Delta E1$ is less than 1 ($\Delta E1<1$) and $\Delta E2$ is greater than or equal to 1 ($\Delta E2 \geq 1$), the resin molded portion is determined to be reusable. In this case, even if the resin molded portion is influenced by external factors, it can be determined that the resin molded portion retains its recyclable physical properties. The reason why the resin molded portion is determined to be recyclable when $\Delta E1<1$ and $\Delta E2 \geq 1$ is that, for example, the degree of influence from external factors when $\Delta E1<1$ for the discoloration checker has been identified. It has been confirmed that the resin molded portion under this degree of influence from external factors retains its recyclable physical properties. As such, even if the resin molded portion discolors, it can still be considered recyclable.

When the degree of discoloration of the discoloration checker is large and the degree of discoloration of the resin molded portion is also large, the resin molding part is determined to be neither reusable nor recyclable. In other words, when $\Delta E2$ is greater than or equal to $\Delta E1$ and $\Delta E1$ is greater than or equal to 1 ($\Delta E2 \geq \Delta E1 \geq 1$), the resin molded portion is determined to be neither reusable nor recyclable. In such cases, the resin molded portion is determined to have degraded to physical properties that are neither reusable nor recyclable. Thus, the resin molded portion is determined to be neither reusable nor recyclable.

When the resin molded portion discolors, it is recyclable with $\Delta E1<1$, and not recyclable with $\Delta E1 \geq 1$. The reason for determining whether the resin molded portion is recyclable is as follows.

The degree of influence from external factors when the discoloration checker has $\Delta E1$ less than 1 ($\Delta E1<1$) has been identified. It has been confirmed that the resin molded portion retains recyclable physical properties under this degree of influence.

Further, the degree of influence from external factors when the discoloration checker has $\Delta E1$ greater than or equal to 1 ($\Delta E1 \geq 1$) has been identified. It has been confirmed that the resin molded portion does not retain recyclable physical properties under this degree of influence.

As the color sample, a color sample prepared at the start of use of the resin molded portion may be used, or a color sample prepared at the time of inspection or before the inspection may be used instead. As the former (i.e., the color sample prepared at the start of use of the resin molded portion), for example, any of the following (1) to (3) can be used, and as the latter (i.e., color sample prepared at the time of inspection or before the inspection), for example, any of the following (4) to (7) can be used. The same determination result is obtained regardless of which color sample from (1) to (7) is used.

(1) A resin component placed in the vicinity of the discoloration checker, maintained with little or no discoloration (2) A resin component stored with little or no discoloration and brought in during the inspection of a used product (3) A resin component maintained in a manner that enables the color difference from the discoloration checker of a used product to be checked, using a method different from the above (1) and (2)

(4) A resin component molded in standard colors and maintained with little or no discoloration due to deterioration, or kept substantially free from discoloration by being replaced when discolored (5) A resin portion included in the resin molded portion, treated with measurements (e.g., seal application) to prevent deterioration caused by external factors such as ultraviolet rays, heat, and water vapor, and maintained with little or no discoloration (6) Materials (e.g., coated metals and other materials) with little or no discoloration caused by deterioration from external factors (7) A product produced by a method different from the above (4) to (6)

As the color sample, for example, a color sample of standard colors is used. The standard colors are defined as standard values in a product standard or specification and refer to colors or color differences expressed by a quantitative method.

Example 1

Figure 1B:
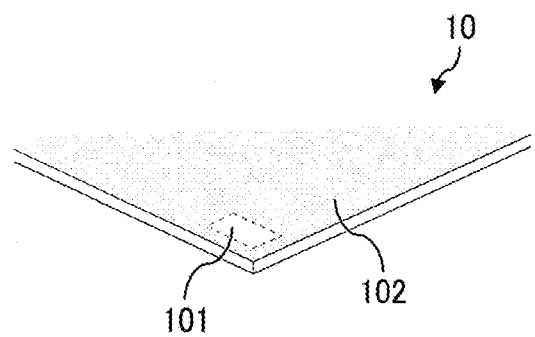
FIG. 1B is a diagram of a time-dependent discoloration checker and resin molded portion.

FIGS. 1A and 1B are schematic views of a resin molded component according to an embodiment of the present disclosure. The resin molded component 10 includes a discoloration checker 101 and a resin molded portion 102. FIG. 1A is a diagram of an initial-state resin molded component, and FIG. 1B is a diagram of the resin molded component after some time has elapsed from FIG. 1A. In FIGS. 1A and 1B, the discoloration checker 101 and the resin molded portion 102 are integrated with each other. The discoloration checker is placed at a position to enable the color difference from the resin molded portion to be checked.

As illustrated in FIG. 1A, the discoloration checker 101 and the resin molded portion 102 have the same initial color. The discoloration checker 101 and the resin molded portion 102 are influenced by external factors to substantially the same degree. At a certain point in time after the passage of time illustrated in FIG. 1B, the discoloration checker 101 has discolored to a smaller degree than the resin molded portion 102.

The color difference between the discoloration checker 101 and the color sample of the standard colors, as well as the color difference between the discoloration checker 101 and the resin molded portion 102, can be visually compared. This allows a color change in the resin molded portion 102 to be visually detected by checking the discoloration checker 101 and the resin molded portion 102, making it easy to identify the deterioration of the resin molded portion 102.

Examples 2 and 3

Figure 2:
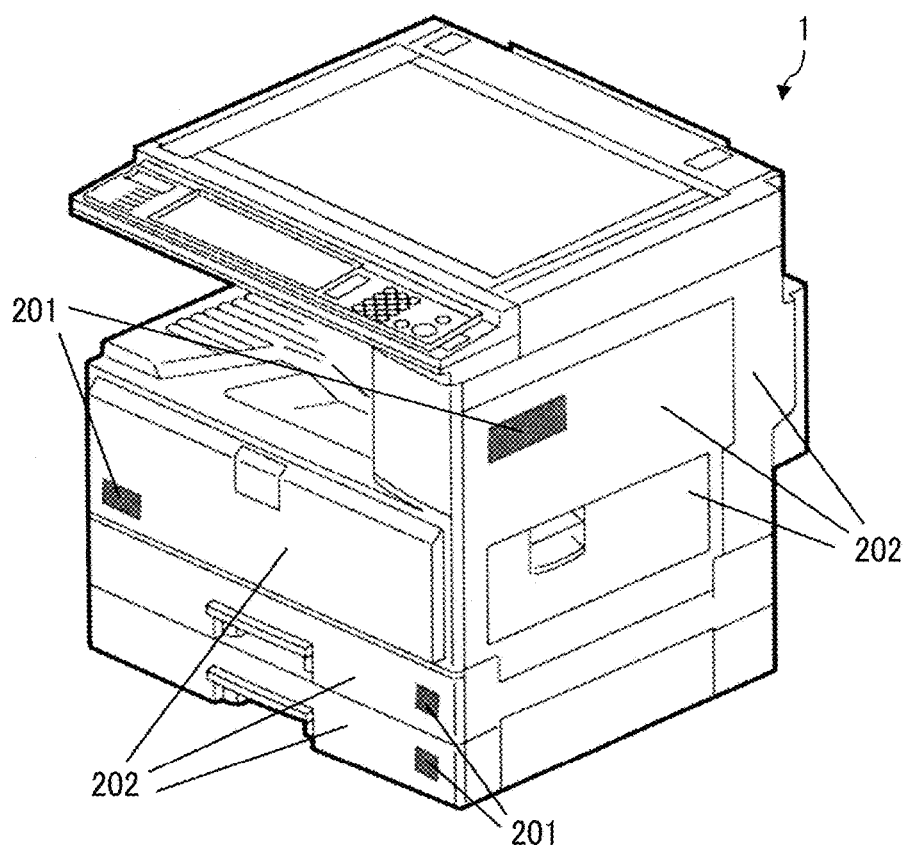
FIG. 2 is a diagram of the arrangement of a discoloration checker in an image forming apparatus.
Figure 3:
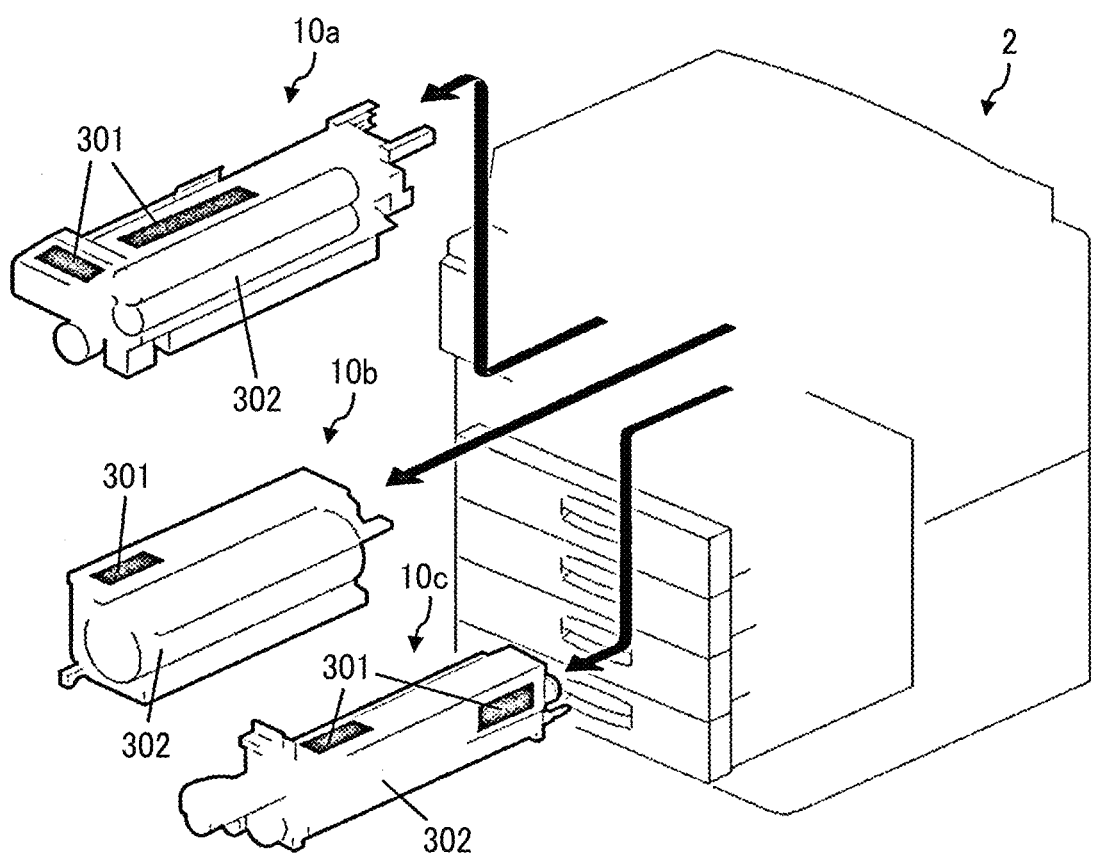
FIG. 3 is a diagram of the arrangement of a discoloration checker in an image forming apparatus.

FIGS. 2 and 3 are diagrams each illustrating another example of a resin molded component.

An image forming apparatus 1 illustrated in FIG. 2 includes a discoloration checker 201 and a resin molded portion 202. The image forming apparatus 1 is an example of a product in which a resin molded component is used. An image forming apparatus 2 illustrated in FIG. 3 has resin molded components 10a to 10c attached inside it. The resin molded components 10a to 10c are also referred to as units, and each include a discoloration checker 301 and a resin molded portion 302.

The arrangement of the discoloration checker 201 may be selected as appropriate. The discoloration checker 201 is placed on the external surface of the outer casing of the product, for example, as illustrated in FIG. 2, and can be visually observed without disassembling the product. The discoloration checker 301 is disposed on the outer surface of the unit attached inside the product, for example, as illustrated in FIG. 3, and can be visually observed without disassembling the product. The term "without disassembling" refers to, for example, that the discoloration checker can be seen from the outside by opening the cover or by removing a unit. The discoloration checkers 201 and 301 are arranged at positions where the color difference from the resin molded portions 202 and 302 can be compared.

Example 4

The following describes an example of a determination method. Table 1 below presents the combinations of colors of the discoloration checker and the resin molded portion of a used product, as well as whether the component with the discoloration checker is reusable or recyclable. Cases 1 to 3 presented in Table 1 indicate color differences $\Delta E1$ and $\Delta E2$, as well as the combinations of colors at the time of determination.

In Table 1, the mark "≈" indicates that the color difference $\Delta E$ is less than 1 ($\Delta E<1$), and the mark "≠" indicates that the color difference $\Delta E$ is greater than or equal to 1 ($\Delta E \geq 1$).

TABLE 1

| CASE | Discoloration Checker (Color Difference From Color Sample) | Resin Molded Portion (Color Difference From Color Sample) | Color Combination | Reusability/ Recyclability |
| --- | --- | --- | --- | --- |
| 1 | $\Delta E1 < 1$ | $\Delta E2 < 1$ | Color Sample ≈ Discoloration Checker and Color Sample ≈ Resin Molded Portion | Reusable |

TABLE 1-continued

| CASE | Discoloration Checker (Color Difference From Color Sample) | Resin Molded Portion (Color Difference From Color Sample) | Color Combination | Reusability/ Recyclability |
| --- | --- | --- | --- | --- |
| 2 | ΔE1 < 1 | ΔE2 ≥ 1 | Color Sample ≈ Discoloration Checker and Color Sample ≠ Resin Molded Portion | Recyclable |
| 3 | ΔE1 ≥ 1 | ΔE2 ≥ 1 | Color Sample ≠ Discoloration Checker and Color Sample ≠ Resin Molded Portion | Non-Reusable and Non-Recyclable |

Case 1 is an example where the discoloration of both the discoloration checker and the resin molded portion are small. As represented in Table 1, in Case 1, the color difference ΔE1 between the discoloration checker and the color sample is less than 1 (ΔE1<1), and the color difference ΔE2 between the resin molded portion and the color sample is less than 1 (ΔE2<1).

In Case 1, the resin molded portion retains reusable physical properties, which is determined to be reusable.

By obtaining the color difference between the color sample and the discoloration checker, as well as the color difference between the color sample and the resin molded portion, whether the resin molded portion of the resin molded component is reusable or recyclable can be determined. The color difference between the discoloration checker and the color sample, as well as the color difference between the resin molded portion and the color sample, can be visually obtained using the color sample. This allows for the immediate identification of the degree of deterioration of the resin molded portion and the immediate visual determination of whether the resin molded portion is reusable or recyclable.

Case 2 is an example where the discoloration of the discoloration checker is small and the discoloration of the resin molded portion is large. As represented in Table 1, in Case 2, the color difference ΔE1 between the discoloration checker and the color sample is less than 1 (ΔE1<1), and the color difference ΔE2 between the resin molded portion and the color sample is greater than or equal to 1 (ΔE2≥1).

In Case 2, the resin molded portion retains reusable or recyclable physical properties, which is determined to be recyclable. The color differences ΔE1 and ΔE2 can be visually obtained using the color sample. This allows for the immediate identification of the degree of deterioration of the resin molded portion and the immediate visual determination of whether the resin molded portion is reusable or recyclable.

Case 3 is an example where the discoloration of the discoloration checker is large and the discoloration of the resin molded portion is also large. As represented in Table 1, in Case 3, the color difference ΔE1 between the discoloration checker and the color sample is greater than or equal to 1 (ΔE1≥1), and the color difference ΔE2 between the resin molded portion and the color sample is greater than or equal to 1 (ΔE2≥1).

In Case 3, the resin molded portion is determined to have degraded due to external factors in its use environment to physical properties that are neither reusable nor recyclable. Thus, the resin molded portion is determined to be neither reusable nor recyclable. Thus, the degree of deterioration of the resin molded portion can be immediately visually identified, and whether the resin molded portion is not reusable or recyclable can be immediately visually determined.

The image forming apparatus of the present embodiment is not particularly limited to a specific one and may be selected as appropriate. For example, the image forming apparatuses 1 and 2 may be electrophotographic image forming apparatuses, and include, for example, an electrostatic latent image bearer, an electrostatic latent image forming unit, a charging unit, a developing unit, a transfer unit, and a fixing unit. The resin molded component of the present embodiment can be used in any part of an apparatus such as the image forming apparatus 1 or 2.

In the image forming apparatus of the present embodiment, the discoloration checker is placed at a position where it can be visually observed from the outside during the use of the image forming apparatus. Alternatively, the discoloration checker is included inside the cover of the image forming apparatus and placed at a position where it can be visually observed with the cover open. Alternatively, the resin molded component is included inside the cover of the image forming apparatus and placed at a position where it can be visually observed with the resin molded product detached after the cover is opened.

Aspects of the present disclosure are as follows, for example.

Aspect 1

A resin molded component includes: a discoloration checker made of a first material; and a resin molded portion made of a second material less resistant to discoloration than the first material. Each of the discoloration checker and the resin molded portion discolors due to deterioration caused by a decline in physical properties.

Aspect 2

The resin molded component according to Aspect 1, the discoloration checker is more resistant to discoloration due to ultraviolet rays, heat, or water vapor than the resin molded portion.

Aspect 3

In the resin molded component according to Aspect 1, the first material of the discoloration checker deteriorates in physical properties more slowly than the second material of the resin molded portion.

Aspect 4

In the resin molded component according to Aspect 1, in an initial stage, the first material of the discoloration checker has substantially same color as the second material of the resin molded portion.

Aspect 5

In the resin molded component according to Aspect 1, the discoloration checker is positioned in the resin molded component to allow a color difference from the resin molded portion to be visually observable.

Aspect 6

In the resin molded component according to Aspect 1, the resin molded component is detachably attached inside a cover of an apparatus mounted with the resin molded component, and the discoloration checker is visible with the cover open; or with the resin molded component detached from the apparatus after the cover is opened.

Aspect 7

In the resin molded component according to Aspect 1, at least a part of each of the discoloration checker and the resin molded portion is in an inspection area of the resin molded component, the inspection area being visible from an outside during a use of the resin molded component. During the use of the resin molded component, a first amount of ultraviolet rays received per unit area of the discoloration checker in the inspection area is within ±10% of a second amount of ultraviolet rays received per unit area of the resin molded portion in the inspection area.

Aspect 8

In the resin molded component according to Aspect 1, at least a part of each of the discoloration checker and the resin molded portion is in an inspection area of the resin molded component. When discoloration checker and the resin molded portion are arranged and held for a certain time period during a use of the resin molded component, a first temperature of the discoloration checker in the inspection area is within ±10% of a second temperature of the resin molded portion in the inspection area.

Aspect 9

In the resin molded component according to Aspect 1, at least a part of each of the discoloration checker and the resin molded portion is in an inspection area of the resin molded component. A first degree of influence of water vapor on the discoloration checker in the inspection area is within ±10% of a second degree of influence of water vapor on the resin molded portion in the inspection area when a difference between a first color difference $\Delta E1$ and a second color difference $\Delta E2$ is less than or equal to 1. The first degree of influence of water vapor corresponds to a first color difference $\Delta E1$ from a color sample, based on a first discoloration of the discoloration checker after contacting water vapor for a certain time period. The second degree of influence of water vapor corresponds to a second color difference $\Delta E2$ from the color sample, based on a second discoloration of the resin molded portion after contacting water vapor for a certain time period.

Aspect 10

An image forming apparatus comprising the resin molded component according to any one of Aspects 1 to 9.

Aspect 11

A determination method includes comparing the discoloration checker included in the resin molded component according to any one of Aspects 1 to 9 with a color sample to obtain a first color difference $\Delta E1$; comparing the resin molded portion included in the resin molded component with the color sample to obtain a second color difference $\Delta E2$; determining whether the resin molded portion is reusable based on the first color difference $\Delta E1$ and the second color difference $\Delta E2$; and determining that the resin molded portion is reusable or recyclable when $\Delta E1<1$ and $\Delta E2<1$.

Aspect 12

A determination method includes comparing the discoloration checker included in the resin molded component according to any one of Aspects 1 to 9 with a color sample to obtain a first color difference $\Delta E1$; comparing the resin molded portion included in the resin molded component with the color sample to obtain a second color difference $\Delta E2$; determining whether the resin molded portion is reusable based on the first color difference $\Delta E1$ and the second color difference $\Delta E2$; and determining that the resin molded portion is reusable or recyclable when $\Delta E1<1$ and $\Delta E2\geq1$.

Aspect 13

A determination method includes comparing the discoloration checker included in the resin molded component according to any one of Aspects 1 to 9 with a color sample to obtain a first color difference $\Delta E1$; comparing the resin molded portion included in the resin molded component with the color sample to obtain a second color difference $\Delta E2$; determining whether the resin molded portion is reusable based on the first color difference $\Delta E1$ and the second color difference $\Delta E2$; and determining that the resin molded portion is reusable or recyclable when $\Delta E2 \geq \Delta E1 \geq 1$.

Aspect 14

A resin molded component includes a discoloration checker made of a first material discolored at a first speed; and a resin molded portion including the discoloration checker, the resin molded portion made of a second material discolored at a second speed faster than the first speed at which the first material of the discoloration checker discolors.

Aspect 15

In the resin molded component according to Aspect 14, the first material of the discoloration checker discolors at the first speed slower than the second speed at which the second material of the resin molded portion discolors due to at least one of ultraviolet rays, heat, or water vapor.

Aspect 16

In the resin molded component according to Aspect 1, physical properties of the first material of the discoloration checker deteriorate at the first speed slower than the second speed at which physical properties of the second material of the resin molded portion deteriorate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A resin molded component comprising:
    a discoloration checker made of a first material discolored at a first speed; and
    a resin molded portion including the discoloration checker, the resin molded portion made of a second material discolored at a second speed faster than the first speed at which the first material of the discoloration checker discolors.

2. The resin molded component according to claim 1, wherein:
    the first material of the discoloration checker discolors at the first speed slower than the second speed at which the second material of the resin molded portion discolors due to at least one of ultraviolet rays, heat, or water vapor.

3. The resin molded component according to claim 1, wherein:
    physical properties of the first material of the discoloration checker deteriorate at the first speed slower than the second speed at which physical properties of the second material of the resin molded portion deteriorate.

4. The resin molded component according to claim 3, wherein:
the physical properties of the first material and the physical properties of the second material include at least one of molecular weight or mechanical strength.

5. The resin molded component according to claim 1, wherein:
in an initial stage, the first material of the discoloration checker has substantially same color as the second material of the resin molded portion.

6. The resin molded component according to claim 1, wherein:
the discoloration checker is positioned in the resin molded component to allow a color difference from the resin molded portion to be visually observable.

7. The resin molded component according to claim 1, wherein:
the resin molded component is detachably attached inside a cover of an apparatus mounted with the resin molded component, and
the discoloration checker is visible;
with the cover open; or
with the resin molded component detached from the apparatus after the cover is opened.

8. The resin molded component according to claim 1, wherein:
at least a part of each of the discoloration checker and the resin molded portion is in an inspection area of the resin molded component, the inspection area being visible from an outside during a use of the resin molded component, and
during the use of the resin molded component, a first amount of ultraviolet rays received per unit area of the discoloration checker in the inspection area is within ±10% of a second amount of ultraviolet rays received per unit area of the resin molded portion in the inspection area.

9. The resin molded component according to claim 1, wherein:
at least a part of each of the discoloration checker and the resin molded portion is in an inspection area of the resin molded component, and
when discoloration checker and the resin molded portion are arranged and held for a certain time period during a use of the resin molded component, a first temperature of the discoloration checker in the inspection area is within ±10% of a second temperature of the resin molded portion in the inspection area.

10. The resin molded component according to claim 1, wherein:
at least a part of each of the discoloration checker and the resin molded portion is in an inspection area of the resin molded component,
a first degree of influence of water vapor on the discoloration checker in the inspection area is within =10% of a second degree of influence of water vapor on the resin molded portion in the inspection area when a difference between a first color difference $\Delta E1$ and a second color difference $\Delta E2$ is less than or equal to 1,
the first degree of influence of water vapor corresponds to a first color difference $\Delta E1$ from a color sample, based on a first discoloration of the discoloration checker after contacting water vapor for a certain time period, and
the second degree of influence of water vapor corresponds to a second color difference $\Delta E2$ from the color sample, based on a second discoloration of the resin molded portion after contacting water vapor for a certain time period.

11. An image forming apparatus comprising the resin molded component according to claim 1.

12. The resin molded component according to claim 1, wherein:
the first material of the discoloration checker is more resistant to discoloration than the second material of the resin molded portion to serve as a visual reference for determining a degree of deterioration of the resin molded portion.

13. The resin molded component according to claim 1, wherein:
the discoloration checker and the resin molded portion are influenced by external factors to substantially the same degree.

14. The resin molded component according to claim 1, wherein:
the discoloration checker is integral with the resin molded portion.

15. The resin molded component according to claim 1, wherein:
a determination of whether the resin molded portion is reusable is made based on a first color difference $\Delta E1$ between the discoloration checker and a color sample and a second color difference $\Delta E2$ between the resin molded portion and the color sample.

16. The resin molded component according to claim 15, wherein the resin molded portion is determined to be reusable when $\Delta E1<1$ and $\Delta E2<1$.

17. The resin molded component according to claim 15, wherein the resin molded portion is determined to be recyclable when $\Delta E1<1$ and $\Delta E \geq 1$.

18. The resin molded component according to claim 15, wherein the resin molded portion is determined to be neither reusable nor recyclable when $\Delta E2 \geq \Delta E1 \geq 1$.

19. A resin molded component for determining a degree of material deterioration, the component comprising:
a discoloration checker made of a first material that discolors at a first rate when exposed to an environmental factor; and
a resin molded portion made of a second material that discolors at a second rate, different from the first rate, when exposed to the environmental factor,
wherein the discoloration checker and the resin molded portion are positioned relative to each other to allow for a visual comparison between a color of the discoloration checker and a color of the resin molded portion to determine the degree of material deterioration of the resin molded portion.

20. The resin molded component according to claim 19, wherein:
the first rate of discoloration is slower than the second rate of discoloration.

* * * * *